United States Patent
Faris et al.

(10) Patent No.: US 6,859,245 B2
(45) Date of Patent: Feb. 22, 2005

(54) MULTILAYER REFLECTIVE FILMS HAVING NON-LINEAR SPACING OF LAYERS

(75) Inventors: Sadeg M. Faris, Pleasantville, NY (US); Le Li, Hopewell Junction, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 10/699,633

(22) Filed: Oct. 31, 2003

(65) Prior Publication Data

US 2004/0150772 A1 Aug. 5, 2004

Related U.S. Application Data

(63) Continuation of application No. 09/039,303, filed on Mar. 14, 1998, now Pat. No. 6,661,486, which is a continuation-in-part of application No. 08/805,603, filed on Feb. 26, 1997, now Pat. No. 5,940,150, which is a continuation-in-part of application No. 08/739,467, filed on Oct. 29, 1996, now Pat. No. 6,034,753, which is a continuation-in-part of application No. 08/550,022, filed on Oct. 30, 1995, now Pat. No. 5,691,789.

(51) Int. Cl.$^7$ .............................................. G02F 1/1335
(52) U.S. Cl. ........................................ 349/115; 349/115
(58) Field of Search ................................. 349/115, 194; 428/402, 363; 106/493, 31.27

(56) References Cited

U.S. PATENT DOCUMENTS

| | | | | |
|---|---|---|---|---|
| 5,825,542 A | * | 10/1998 | Cobb et al. ................. | 359/487 |
| 5,825,543 A | * | 10/1998 | Ouderkirk et al. .......... | 359/494 |
| 5,882,774 A | * | 3/1999 | Jonza et al. ................. | 428/212 |

* cited by examiner

*Primary Examiner*—Kenneth Parker
*Assistant Examiner*—David Chung

(57) ABSTRACT

A reflector for reflecting a broad bandwidth of electromagnetic (EM) radiation, comprising a sheet comprising a large plurality of pairs of layers of transparent polymer material parallel to a surface of the sheet, each pair of layers having a difference in the index of refraction between the materials in each layer of the pair, the total thickness of each pair of layers in the large plurality of layers varying substantially continuously and non linearly across the thickness of the sheet, is disclosed.

28 Claims, 4 Drawing Sheets

MULTILAYER REFLECTIVE FILMS HAVING NON-LINEAR SPACING OF LAYERS

RELATED CASES

This is a continuation of Ser. No. 09/039,303 filed Mar. 14, 1998, now U.S. Pat. No. 6,661,486, which is a Continuation-in-part of application Ser. No. 08/805,603 entitled "Electro-optical glazing structures having total-reflection and transparent modes of operation for use in dynamical control of electromagnetic radiation" by Sadeg M. Faris and Le Li, filed Feb. 26, 1997, U.S. Pat. No. 6,034,753 which is a continuation-in-part of: application Ser. No. 08/739,467 entitled "Super Broadband Reflective Circularly Polarizing Material And Method Of Fabricating And Using Same In Diverse Applications", by Sadeg M. Faris and Le Li filed Oct. 29, 1996, U.S. Pat. No. 6,034,753 which is a Continuation-in-part of application Ser. No. 08/550,022 (Now U.S. Pat. No. 5,691,789) entitled "Single Layer Reflective Super Broadband Circular Polarizer and Method of Fabrication Therefor" by Sadeg M. Faris and Le Li filed Oct. 30, 1995; copending application Ser. No. 08/787,282 entitled "Cholesteric Liquid Crystal Inks" by Sadeg M. Faris filed Jan. 24, 1997, which is a Continuation of application Ser. No. 08/265,949 filed Jun. 2, 1994, which is a Divisional of application Ser. No. 07/798,881 entitled "Cholesteric Liquid Crystal Inks" by Sadeg M. Faris filed Nov. 27, 1991, now U.S. Pat. No. 5,364,557; copending application Ser. No. 08/715,314 entitled "High-Brightness Color Liquid Crystal Display Panel Employing Systemic Light Recycling And Methods And Apparatus For Manufacturing. The Same" by Sadeg Faris filed Sep. 16, 1996; and copending application Ser. No. 08/743,293 entitled "Liquid Crystal Film Structures With Phase-Retardation Surface Regions Formed Therein And Methods Of Fabricating The Same" by Sadeg Faris filed Nov. 4, 1996; each said Application being commonly owned by Reveo, Inc, and incorporated herein by reference in its entirety.

BACKGROUND OF THE INVENTION

1. Field of Invention

The present invention relates generally to reflective film having a large plurality of extruded or coextruded layers, where the thickness of the layers varies non-linearly throughout the thickness of the film to produce a very broad band reflective film. Such films may be used to great advantage in an electro-optical glazing structure having reflection, semi-transparent, and transparent modes of operation which are electrically-switchable for use in dynamically controlling electromagnetic radiation flow in diverse applications.

2. Brief Description of the Prior Art

The use of multilayer polymer films for controlling reflectivity has been known for many years. Such films comprise many layers, generally alternating between two types of transparent polymer, each having different refractive indices and an appropriate thickness related to the wavelength of the light to be controlled. U.S. Pat. No. 3,711,176, by Alfrey, Jr. et al. details theoretical details of such a film. U.S. Pat. No. 3,610,729, by Howard Rogers introduces a multilayer polarizer, where each alternate layer is birefringent, where the index of refraction for light of a first linear polarization differs from layer to layer and that linear polarization is reflected, and the index of refraction for light of the second linear polarization is the same from layer to layer and the second linear polarization light is transmitted. The bandwidth of the light reflected from such multilayer films is generally limited to a small portion of the bandwidth of visible light (20 nanometers in the case of the Alfey patent. Also, if infra red reflecting film is required which is transparent in the visible region, higher order effects occur to produce unwanted reflected colors from the film. U.S. Pat. No. 5,103,337, by Schrenk et al. proposes using more than two different materials to control unwanted higher order effects. U.S. Pat. No. 5,686,979, by Weber et al., proposes to use multilayer reflecting polarizing film as a "smart window" for the control of light by reflecting the light. The reflectivity, however, is generally limited to a narrow bandwidth and such films are not equally transparent outside of the reflective bandwidth of the films. General references on polymer dispersed liquid crystals may be found in detail in "Polymer Dispersed Liquid crystal displays", by J. W. Doane, a chapter in "Liquid Crystals", Ed. B. Bahadur, World Scientific Publishing, Singapore, and "CLC/polymer dispersion for haze-free light shutters, by D. Yang et al. Appl. Phys. Lett. 60, 3102 (1992). Smart Window Design is treated in "Electrochromism and smart window design", by C. Granqvist, Solid State Ionics 53–56 (1992) and "large scale electochromic devices for smart windows and absorbers", by T. Meisel and R. Baraun, SPIE 1728, 200 (1992). The above identified US patents and references are hereby incorporated by reference.

OBJECTS OF THE PRESENT INVENTION

It is an object of the invention to provide a reflective multilayer polymer film having a very wide bandwidth.

It is an object of the invention to provide a reflective multilayer polymer film having little variation in the reflectivity outside of the reflective bandwidth of the film.

It is an object of the invention to provide a polarizing reflective multilayer polymer film having a very wide bandwidth.

It is an object of the invention to provide a polarizing reflective multilayer polymer film having little variation in the reflectivity outside of the reflective bandwidth of the film.

It is an object of the invention to provide a "smart window" using a polarizing reflective multilayer polymer film having a very wide bandwidth.

It is an object of the invention to provide a "smart window" using a polarizing reflective film having a very wide bandwidth combined with a reflective multilayer polymer film having a very wide bandwidth.

It is an object of the invention to provide a "smart window" using a polarizing reflective film having a very wide bandwidth combined with a reflective multilayer polymer film having little variation in the reflectivity outside of the reflective bandwidth of the film.

It is an object of the invention to provide a "smart window" using a polarizing reflective multilayer polymer film having a very wide bandwidth combined with a light scattering layer for further control of transmitted light.

SUMMARY OF THE PRESENT INVENTION

The present invention provides a reflective film comprising a large plurality of pairs layers of transparent polymer, each layer of the pair having a different index of refraction. The light reflected from the polymer interfaces add coherently to give high reflectivity. The layer thicknesses change through the thickness of the film in a substantially continuous and non-linear way, so that a very broad band width of light may be reflected and so that higher order effects are minimized.

DETALED DESCRIPTION OF THE PRESENT INVENTION

Figure 1A:
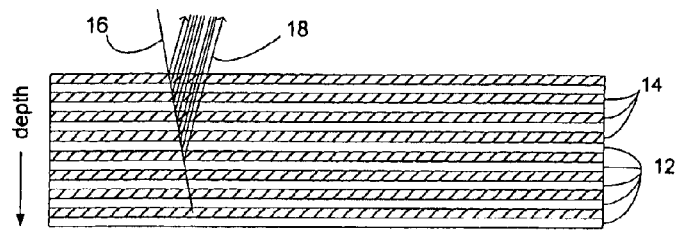
FIG. 1 shows a sketch of a prior art multilayer polymer reflector.

FIG. 1a shows a sketch of the prior art multilayer reflector film 10. Pairs of layers of two different transparent polymer materials 12 and 14 are arranged adjacent with each layer adjacent the next layer. Such films are generally co-extruded and pulled so that the thickness of the layers is in the submicrometer range. For a reflector, the layers shown in FIG. 1a are equal to one quarter of an optical wavelength (the wavelength of the light to be reflected divided by the index of refraction of the material for light of that wavelength). An incident light ray 16 is shown impinging on the film 10, and many reflections 18 are shown reflecting from the interface of the two transparent polymer materials 12 and 14. The "wavelength" of designed reflectivity is usually designed for light incident normally on to the film 10. FIG. 1a shows the light slightly off normal incidence, and for large angles of incidence the wavelength of maximum reflectivity shifts to longer wavelengths because of the longer path length of the light in the materials 12 and 14. The light rays 16 and 18 are shown unrefracted at the air material interface for clarity of presentation.

Figure 1B:
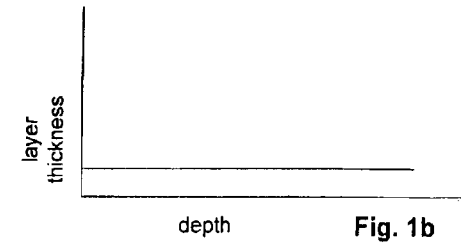

FIG. 1b shows a sketch of the thickness of the material layers as a function of depth into the film for the stack shown in FIG. 1a.

Figure 2A:
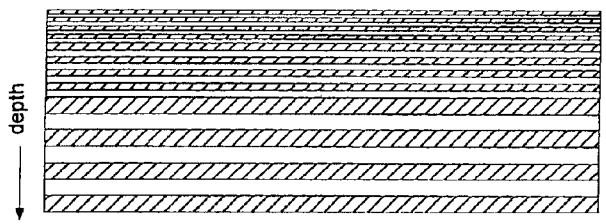
FIG. 2 shows the distribution of thickness of layers of prior art multilayered polymer reflectors as a function of depth into the multilayer film.
Figure 2B:

FIG. 2a is a sketch of a prior art multilayer reflector which attempts to make the reflector broad band. The prior art literature proposes a monotonic increase in the thickness of the layers. The layer thickness increases by step function in FIG. 2a. Each stack of different thicknesses reflects a different narrow band of light. The reflection coefficient is not constant over the reflective bandwidth of the film. A problem arises when the stack shown in FIG. 2a is used for an infrared reflecting film to cover a window. Second order effects produce a visible color in the film. This problem is addressed in the cited U.S. Pat. No. 5,103,337, by Schrenk et al., who proposed films having three different materials to do away with second order reflection effects. FIG. 2b shows a sketch of the layer thickness as a function of depth into the film.

Figure 3A:
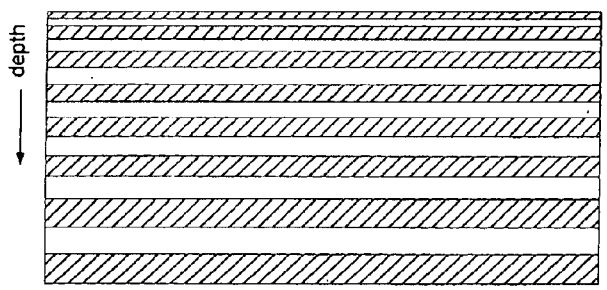
FIG. 3 shows the non linear distribution of thickness of layers as a function of depth into the film of the method of the present invention.
Figure 3B:
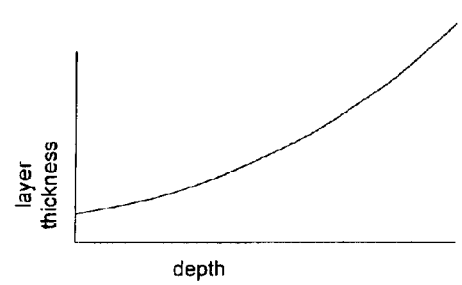

The apparatus of the present invention is shown in FIG. 3a. The transparent polymer material layers have thicknesses which increase into the depth of the film in a non-linear way. It is shown in great detail in copending application Ser. No. 08/739,467 entitled "Super Broadband Reflective Circularly Polarizing Material And Method Of Fabricating And Using Sarne In Diverse Applications", by Sadeg M. Faris and Le Li filed Oct. 29, 1996, which is a Continuation-in-Part of copending application Ser. No. 08/550,022 (Now U.S. Pat. No. 5,691,789) entitled "Single Layer Reflective Super Broadband Circular Polarizer and Method of Fabrication Therefor" by Sadeg M. Faris and Le Li filed Oct. 30, 1995, that a non linear distribution of the twist of a cholesteric liquid crystal (CLC) polarizer is vital to producing a broad band reflector having a reflectivity which varies little over the reflection band. Such CLC reflectors also have smooth reflectivity profiles in the second order if the CLC material is used to reflect infrared light.

To use the CLC broadband reflectors of the prior applications to reflect all the incident light in a particular bandwidth, of two types of CLC must be used. One type reflects right hand polarized (RHP) light. The other reflects left hand polarized (LHP) light.

In the present invention, the reflectivity at the interfaces of the two types of materials is not necessarily dependent on the polarization of the incident light. However, the two types of material shown in FIG. 3a may include birefringent materials as detailed in U.S. Pat. No. 3,610,729, by Howard Rogers. In this case, the multilayer polarizer resulting would be very broad band. Such polarizers could be used to great effect in the "smart window" applications of copending application Ser. No. 08/805,603 entitled "Electro-optical glazing structures having total-reflection and transparent modes of operation for use in dynamical control of electromagnetic radiation" by Sadeg M. Faris and Le Li, and U.S. Pat. No. 5,686,979, by Weber et al.

Figure 4A:
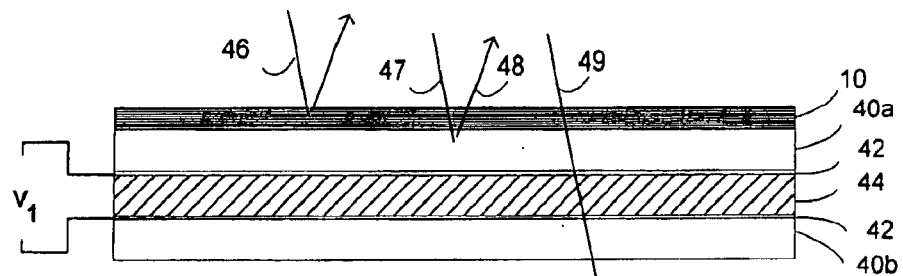
FIG. 4 shows a glazing panel for a "smart window" using the apparatus of the invention
Figure 4B:
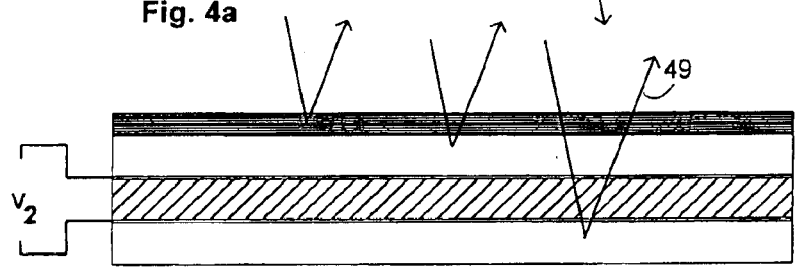

FIG. 4a shows the film of the invention 10 used to reflect a first bandwidth of light, for example the infrared bandwidth, while the "smart window" of the above identified references is used to control the transmission and reflection of a second bandwidth of light (for example the visible portion). Smart windows are typically a glazing structure comprising two polarization dependent transparent sheets 40a and 40b sandwiching a transparent conduction material 42 such as indium tin oxide (ITO) and a polarization control material which changes state under an electric field 44. Support materials such as glass panes are not shown for clarity. Light of the first bandwidth 46 is reflected at the film of the invention 10, while light in the second bandwidth passes film 10. In one embodiment of the smart window using multilayer polarizers to reflect light, light of a first linear polarization is reflected from layer 40a, while light of the second polarization is transmitted through the polarization control material 44. Depending on the voltage imposed across the polarization control material, the polarization state of the light transmitted is controlled so that the light is reflected or the light is transmitted (FIG. 4c) by polarization dependent layer 40b. Other embodiments of smart windows shown in detail in copending applications may controllably transmit or reflect all of the incident light in a broad bandwidth.

Figure 4C:
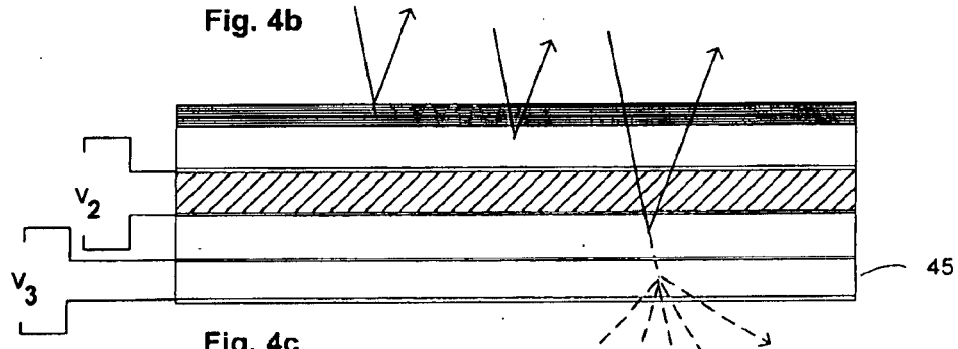

FIG. 4c shows a sketch of an additional embodiment of the invention, whereby an additional controllable layer is added to the smart window structure of FIG. 4a. It is very difficult to ensure that 100% of the light across the entire visible wavelength is reflected, and the privacy of occupants of a room with such a smart window may be compromised. An additional structure 49 is used to control the light which is transmitted through the smart window. The embodiment shown in FIG. 4c uses a scattering layer as layer 49. Layer 49 may also be an absorptive layer, for example and electrochromic panel or absorptive polarizers. Electrochromism is define as a reversible optical absorption change induce in a material by an electrochemical redox process. The electrochromic device employs two electrochromic materials (ECM) with "complimentary" properties. The first electrochromic material is normally reduced and undergoes a colorless-to-colored transition upon reduction. The second electrochromic material is oxidized and undergoes a similar color transition upon gain of electrons. Most electrochromic smart windows adopt a thin film configuration. The two complementary electrochromic materials are coated on two opposite electrodes and remain there during the redox coloration process.

The film of the invention may be used as a polarization reflector in a smart window using linear polarization. This embodiment may be used with or without the film 10 shown in FIG. 1a. The embodiment shown in FIG. 4c may also be used with or without the film 10. This embodiment may also be used with a passive infrared reflecting film comprising two CLC layers, each reflecting opposite polarizations. This embodiment may also be used with an infrared reflecting film comprising flakes embedded in a transparent medium.

Figure 5A:
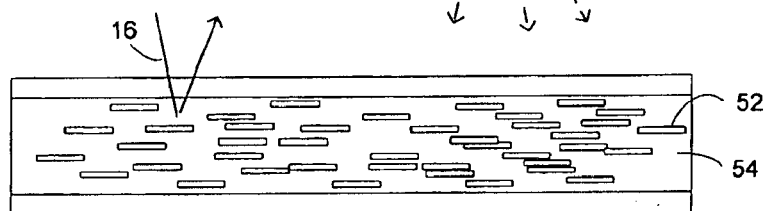
FIG. 5 shows a glazing panel for a smart window using the apparatus of the invention combined with an additional panel for further controlling light transmitted through the "smart window".
Figure 5B:
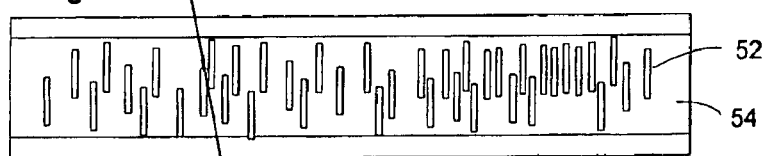
Figure 5C:
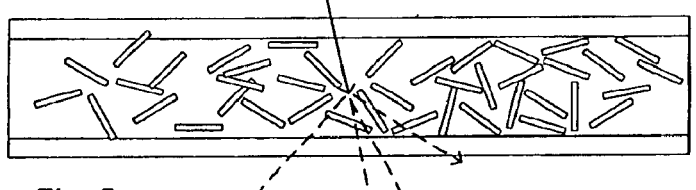

Controllable scattering structures are shown in detail in copending applications which are included by reference. FIGS. 5a-c show a novel structure, whereby flakes 52 of the film of the invention are suspended in a material 54. The orientation of the flakes may be controlled by an electrical field. The light incident upon the scattering structure is shown to be reflected, transmitted, or scattered in FIGS. 5a, 5b, and 5c respectively, depending on the orientation of the flakes. The flakes are typically of dimensions of ten to fifty microns in diameter. Use of such light controlling flakes for CLC materials is shown in copending application Ser. No. 08/787,282 entitled "Cholesteric Liquid Crystal Inks" by Sadeg M. Faris. Flakes of the film of the invention may be used suspended in any transparent material as reflecting paint. The broad bandwidth of the film is useful in reflecting light which is incident at a large angle of incidence to the surface of the film.

Figure 6A:
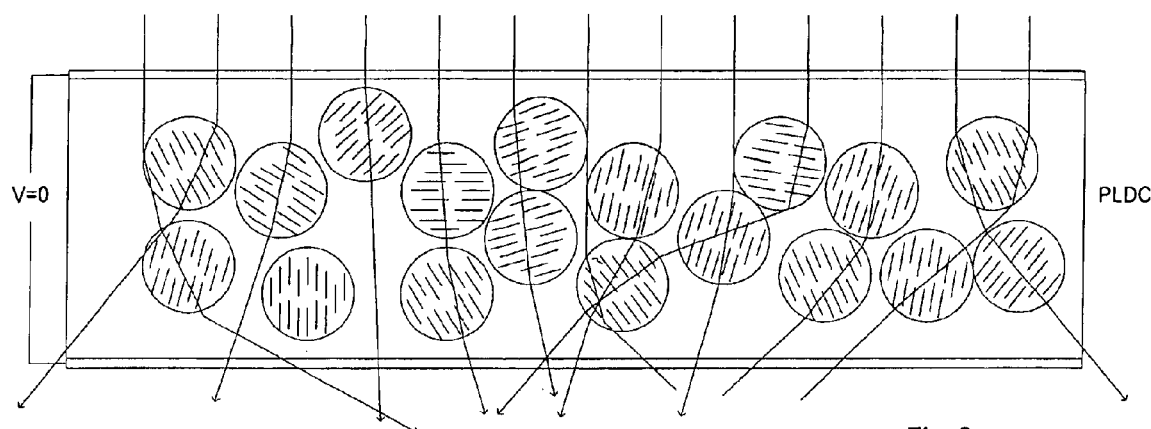
FIGS. 6a–6b show a glazing panel for a "smart window" using the apparatus of the invention combined with an additonal scattering panel for further controllig light transmitted through the "smart widow".
Figure 6B:
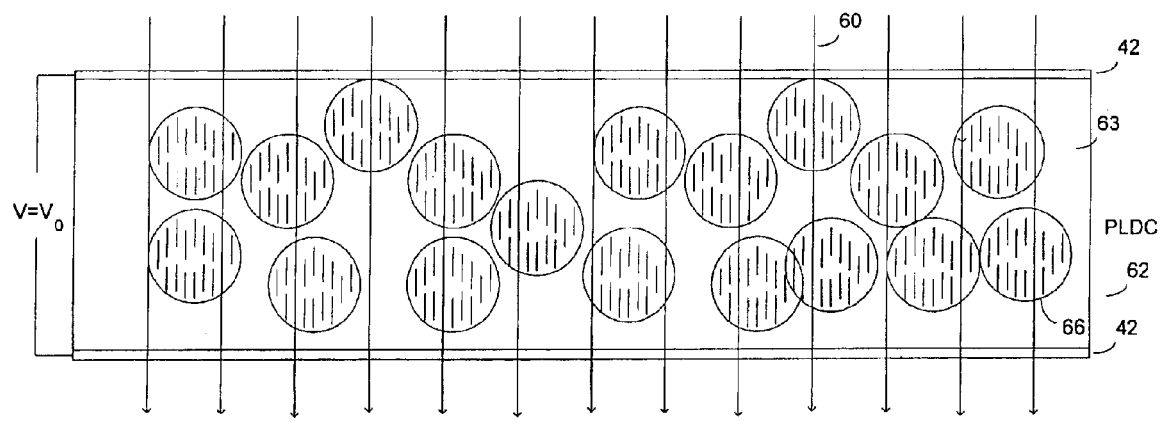

FIGS. 6a and 6b show an embodiment of a scattering layer, which shows light rays 60 incident on a layer 62 which contained an polymer material 63 contained between two transparent electrically conducting layers 42. Contained within the polymer are regions 66 of liquid crystal material formed into small spheres of micron or submicron dimension. Such a material is called a polymer dispersed liquid crystal (PDLC). The molecules of the liquid crystal material, sketched in FIG. 6a as short lines, are correlated by the internal forces in the liquid crystal to have internal order, which may be random from droplet to droplet as shown in FIG. 6a. Light propagating through the polymer material 63 strikes the droplet of liquid crystal material 66, and will in general refract at the polymer liquid crystal interface because there will generally be a change in the index of refraction of the (randomly ordered) liquid crystal material and the polymer material. The layer 62 will then scatter light passing through.

The light rays traced in FIG. 6a are shown scattered and transmitted through the layer 62, which would be the case for very light loading of liquid crystal material in the polymer. In the more general case, light incident on the panel would be as likely scattered backward as forward, and would likely be scattered isotropically in all directions.

FIG. 6b shows the results of applying an electric field across the layer 62 by applying voltage across the conducting layers 42. The electric field forces the liquid crystal molecules in each sphere to line up parallel with the field. In this case, the index of refraction of the liquid crystal material matches the index of the polymer material, and the light rays pass through the layer 62 without deviation or scattering.

Figure 7A:
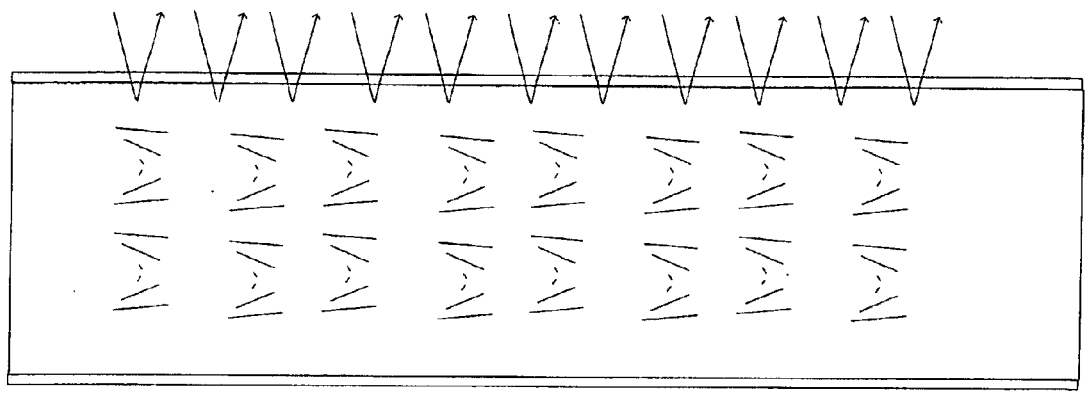
FIGS. 7a–7c show a glazng panel for a "smart window" combined with an additional panel using the apparatus of the invention for further controlling light incident on the "smart window".
Figure 7B:
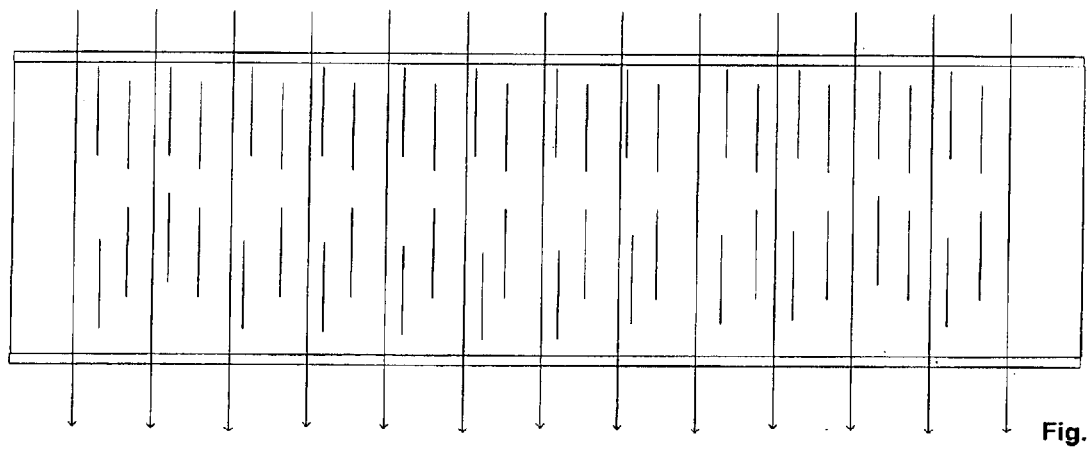
Figure 7C:
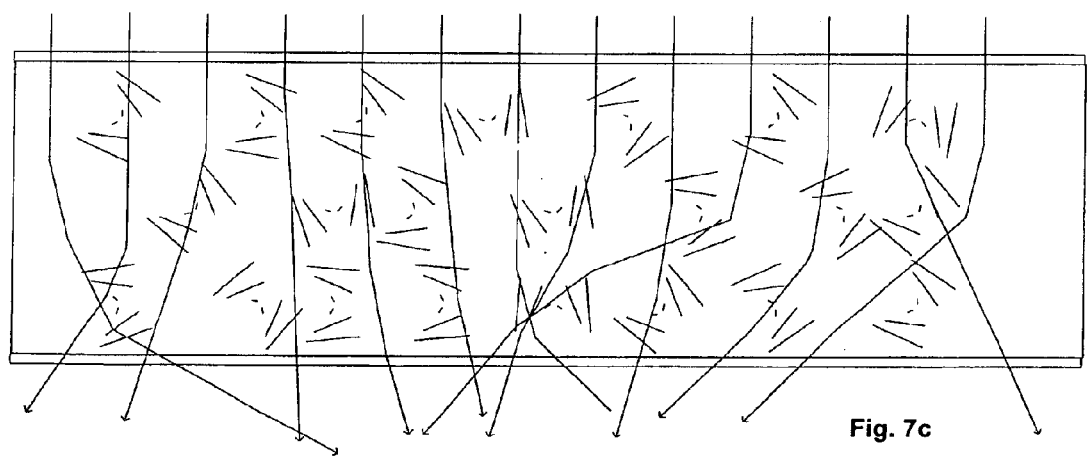

An alternative embodiment for a scattering layer is sketched in FIGS. 7a–c. The liquid crystal material is admixed with a polymer material, but unlike the case of FIG. 6a, the resultant material does not phase segregate. The linear liquid crystal molecules remain entangled in the polymer material, which can be thought of as a mass of wet, springy spaghetti. FIG. 7a shows the liquid crystal molecules as short lines. In the case of FIG. 7a, the molecules are lined up parallel with the conducting plates because, for example, the surfaces of the plates have been rubbed. In the example shown, the internal order of the molecules also aligns then to reflect incident light on the layer 73. When an electric field is impressed across the layer as in FIG. 7b, the molecules rotate to line up parallel to the field, and light propagating parallel to the field passes through the 1a without scattering, reflection, or absorption. When the electric field is turned off, the polymer acts as a restoring force to rotate the molecules back to their starting position as shown in FIG. 7a.

FIG. 7c shows the mixture when no external order is imposed on the liquid crystal material by a rubbed alignment layer or by electric field. The liquid crystal material still wants to lower its internal energy by having near neighbor molecules align with one another, but there is no long range order. The regions of material now scatter light randomly and, with no field applied, the light incident on the layer 74 is scattered. When an electric field is impressed, the molecules swing around to line up with the field, and the light passes through without scattering as in FIG. 7b.

We claim:

1. A reflector for reflecting a broad bandwidth of electromagnetic (EM) radiation, comprising:

a sheet comprising a large plurality of pairs of layers of transparent polymer material parallel to a surface of the sheet, each pair of layers having a difference in the index of refraction between the materials in each layer of the pair, the total thickness of each pair of layers in the large plurality of layers varying substantially continuously and non linearly across the thickness of the sheet.

2. The reflector of claim 1, where the broad bandwidth of the electromagnetic spectrum is in the infrared portion of the electromagnetic spectrum.

3. The reflector of claim 2, further comprising:

an electro-optical glazing structure having reflection and transmission modes of operation for selectively reflecting and transmitting electromagnetic radiation, respectively, the electro-optical glazing structure comprising:

an electro-optical glazing panel having first and second optical states of operation;

optical state switching means for switching the electro-optical panel to the first optical state of operation in order to induce the electro-optical glazing structure into the reflection mode of operation, and for switching the electro-optical panel to the second optical state of operation in order to induce the electro-optical glazing structure into the transmission mode of operation.

4. The electro-optical glazing structure of claim 3, farther comprising a controllable scattering layer.

5. The electro-optical glazing structure of claim 3, wherein the controllable scattering layer comprises a fluid medium containing a large plurality of anisotropically shaped objects for controllably scattering light, the orientation of anisotropically shaped objects controllable by a field.

6. The electro-optical glazing structure of claim 3, wherein the controllable scattering layer comprises a polymer medium containing a large plurality of inclusions, each inclusion containing liquid crystal material, the liquid crystal material controllable by a field.

7. The electro-optical glazing structure of claim 3, wherein the controllable scattering layer comprises a mixture of a polymer medium and a liquid crystal material, the liquid crystal material controllable by a field.

8. The reflector of claim 1, where the broad bandwidth of the electromagnetic spectrum is in the visible portion of the electromagnetic spectrum.

9. The reflector of claim 1, where the broad bandwidth of the electromagnetic spectrum is in the ultraviolet portion of the electromagnetic spectrum.

10. The reflector of claim 1, wherein a large plurality of the sheets are suspended in a transparent medium, the sheets being of micron size.

11. The reflector of claim 10, wherein the transparent medium is a fluid medium.

12. The reflector of claim 11, wherein the orientation of the sheets may be controlled by field, whereby the plurality of sheets may transmit the EM radiation.

13. The reflector of claim 12, wherein the orientation of the sheets may be controlled by field, whereby the plurality of sheets may scatter the EM radiation.

14. The reflector of claim 12, wherein the orientation of the sheets may be controlled by field, whereby the plurality of sheets may reflect the EM radiation in a coherent manner.

15. An electro-optical glazing structure having reflection and transmission modes of operation for selectively reflecting and transmitting a broad band of electromagnetic radiation, respectively, the electromagnetic radiation having a first and a second linear polarization, the electro-optical glazing structure comprising:

an electro-optical glazing panel having first and second optical states of operation; and optical state switching means for switching the electro-optical panel to the first optical state of operation in order to induce the electro-optical glazing structure into the reflection mode of operation, and for switching the electro-optical panel to the second optical state of operation in order to induce the electro-optical glazing structure into the transmission mode of operation, wherein the electro-oplical panel comprises:

a sheet having a large plurality of pairs of layers parallel to a surface of the sheet, each pair of layers having a difference between the transparent polymer materials in each layer of the pair, the difference being in the index of refraction for electromagnetic radiation having the first linear polarization, wherein there is little difference in the index of refraction for electromagnetic radiation having the second linear polarization, the total thickness of each pair of layers in the large plurality of layers varying non linearly across the sheet.

16. The electro-optical glazing structure of claim 15, wherein the electro-optical panel further reflects circularly polarized electromagnetic radiation.

17. The electro-optical glazing structure of claim 16, wherein the electro-optical panel further comprises a cholesteric liquid crystal (CLC) material.

18. The electro-optical glazing structure of claim 15, wherein the electro-optical panel selectively transmits and reflects electromagnetic radiation of a first bandwidth of the EM spectrum, further comprising a reflector of EM radiation which reflects radiation in a second bandwidth of the EM spectrum, the reflector of EM radiation which reflects radiation in a second bandwidth comprising a sheet having a large plurality of pairs of layers parallel to a surface of the sheet, each pair of layers having a difference in the index of refraction between the materials in each layer of the pair.

19. The electro-optical glazing structure of claim 18, wherein the reflector of EM radiation which reflects radiation in a second bandwidth has total thickness of each pair of layers in the large plurality of layers varying non linearly across the sheet.

20. The electro-optical glazing structure of claim 15, further comprising a controllable scattering layer.

21. The electro-optical glazing structure of claim 20, wherein the controllable scattering layer comprises a fluid medium containing a large plurality of anisotropically shaped objects for controllably scattering light, the orientation of anisotropically shaped objects controllable by a field.

22. The electro-optical glazing structure of claim 20, wherein the controllable scattering layer comprises a polymer medium containing a large plurality of inclusions, each inclusion containing liquid crystal material, the liquid crystal material controllable by a field.

23. The electro-optical glazing structure of claim 20, wherein the controllable scattering layer comprises a mixture of a polymer medium and a liquid crystal material, the liquid crystal material controllable by a field.

24. The electro-optical glazing structure of claim 15, wherein the electro-optical panel selectively transmits and reflects electromagnetic radiation of a first bandwidth of the EM spectrum, further comprising a reflector of EM radiation which reflects radiation in a second bandwidth of the EM spectrum, the reflector of EM radiation which reflects radiation in a second bandwidth comprising CLC layers of different handedness.

25. The electro-optical glazing structure of claim 24, the CLC layers have a non linear pitch distribution.

26. The electro-optical glazing structure of claim 3, further comprising a controllable absorbing layer.

27. The electro-optical glazing structure of claim 1, wherein the means for further controlling the electromagnetic radiation comprises an absorbing layer for controllably absorbing light.

28. The electro-optical glazing structure of claim 27, wherein absorbing layer is an electrochromic absorbing layer.

* * * * *